United States Patent
Hanya et al.

(10) Patent No.: US 7,549,340 B2
(45) Date of Patent: Jun. 23, 2009

(54) APPARATUS FOR MEASURING VIBRATION CHARACTERISTIC OF HEAD GIMBAL ASSEMBLY

(75) Inventors: Masao Hanya, Aikoh-gun (JP); Toshiki Ando, Aikoh-gun (JP); Tatsuhiko Nishida, Aikoh-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 181 days.

(21) Appl. No.: 11/654,749

(22) Filed: Jan. 18, 2007

(65) Prior Publication Data
US 2007/0169556 A1    Jul. 26, 2007

(30) Foreign Application Priority Data
Jan. 20, 2006    (JP) ............................. 2006-012654

(51) Int. Cl.
*G01M 7/00* (2006.01)
(52) U.S. Cl. .............................. 73/662; 73/593; 73/597; 73/659
(58) Field of Classification Search ............ 73/662, 73/1.82, 593, 597, 649, 659, 1, 82
See application file for complete search history.

(56) References Cited

U.S. PATENT DOCUMENTS

| | | | | |
|---|---|---|---|---|
| 5,880,587 A | * | 3/1999 | Annis et al. ................. | 324/212 |
| 6,008,640 A | * | 12/1999 | Tan et al. ..................... | 324/212 |
| 6,257,543 B1 | * | 7/2001 | Huelsmann ................. | 248/674 |
| 6,667,840 B1 | * | 12/2003 | Cheong et al. ............... | 360/31 |
| 7,349,170 B1 | * | 3/2008 | Rudman et al. ............... | 360/75 |
| 7,377,190 B2 | * | 5/2008 | Yao et al. .................... | 73/865.9 |
| 7,421,898 B2 | * | 9/2008 | Acar et al. ................. | 73/504.12 |

FOREIGN PATENT DOCUMENTS

JP    2004-101186    4/2004

* cited by examiner

*Primary Examiner*—Hezron Williams
*Assistant Examiner*—J M Saint Surin
(74) *Attorney, Agent, or Firm*—Jordan and Hamburg LLP

(57) ABSTRACT

An apparatus surely measures the vibration characteristic of a head gimbal assembly and has a wide range of resonance frequencies to be set, the apparatus has a first laser Doppler vibrometer to detect a vibration velocity of a shaker, a second laser Doppler vibrometer to detect a vibration velocity of a head of the head gimbal assembly fixed to a fixture, and a reflection mirror to orthogonally reflect a laser beam emitted from the first laser Doppler vibrometer toward the fixture fixed to the shaker, and the apparatus finds the vibration characteristic of the head gimbal assembly according to the detected vibration velocities.

8 Claims, 9 Drawing Sheets

Fig.2
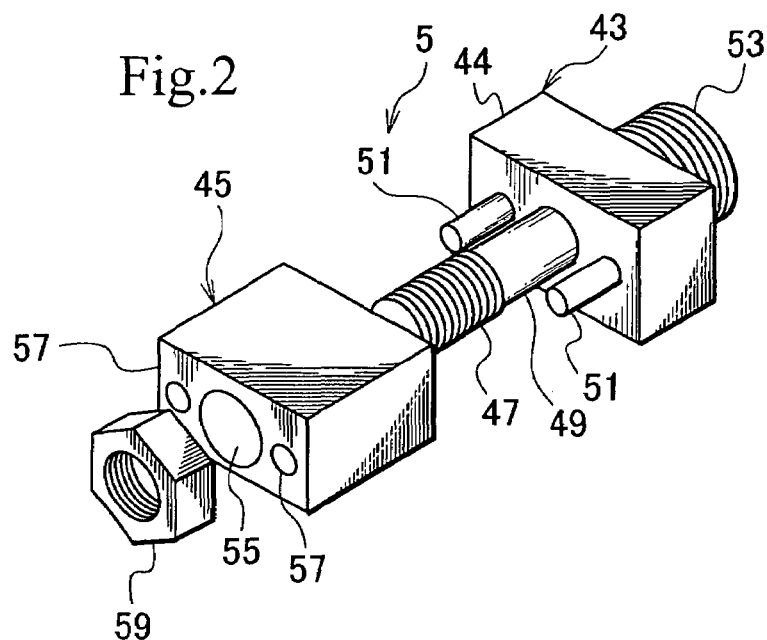
Fig.3
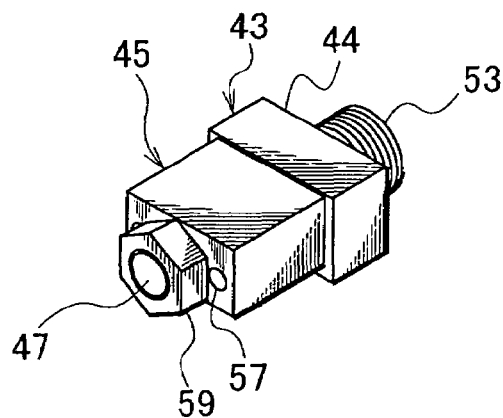
Fig.4
| Model | | New Fixture | High Mode-1 | High Mode-2 |
|---|---|---|---|---|
| Calculated Mass | [g] | 14.26 | 15.69 | 15.59 |
| Resonance Frequency | Mode 1 [kHz] | 10.17 | 11.12 | 20.42 |
| | Mode 2 [kHz] | 19.33 | 19.67 | 25.56 |
| | Mode 3 [kHz] | 34.34 | 37.66 | 45.27 |
| | Mode 4 [kHz] | 51.44 | 53.96 | 68.84 |

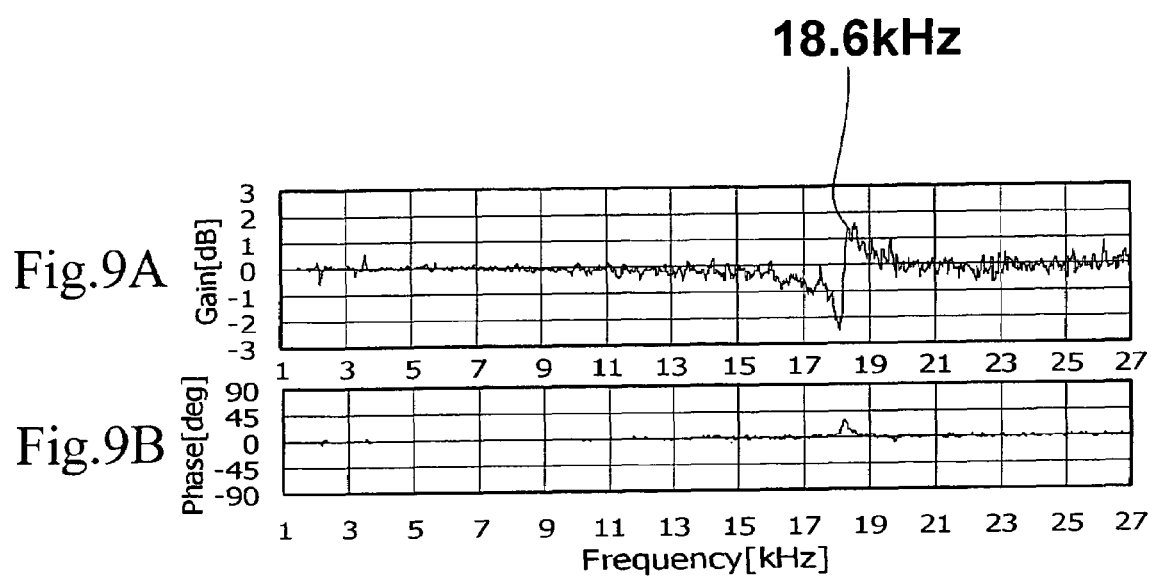
Fig.9A
Fig.9B
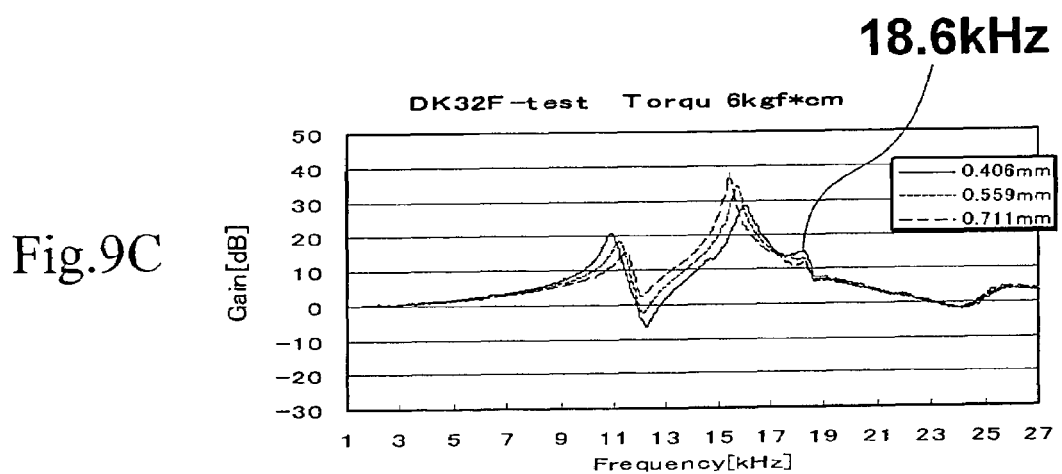
Fig.9C
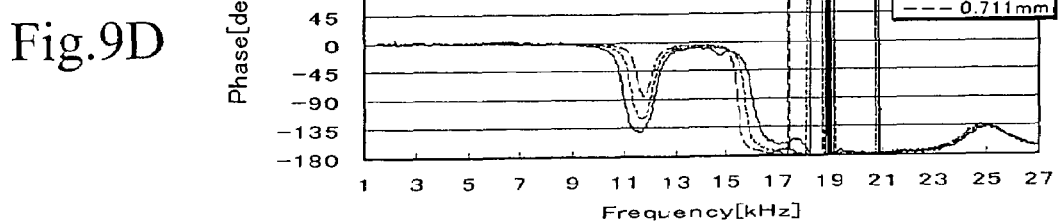
Fig.9D

Fig.12

Mass of Parts

| | SUS(current) | Current Actual | Mg alloy | Duralumin |
|---|---|---|---|---|
| Fixture | 8.61 | | 1.96 | |
| Mount Block | 4.74 | 4.41 | 1.08 | 1.68 |
| Bolt | 2.24 | 2.23 | 0.51 | |

Fig.13

Modes of various Materials Parts

| Model | | Current | M01 | M02 | M03 | M04 | M05 | M06 | A04 |
|---|---|---|---|---|---|---|---|---|---|
| Material | Fixture | SUS | Mg alloy | Mg alloy | SUS | Mg alloy | SUS | SUS | SUS |
| | Mount Block | SUS | Mg alloy | Mg alloy | Mg alloy | SUS | SUS | Mg alloy | Duralumin |
| | Bolt | SUS | Mg alloy | SUS | Mg alloy | Mg alloy | Mg alloy | SUS | SUS |
| Calculated Mass | [g] | 15.59 | 3.56 | 5.29 | 10.20 | 7.21 | 13.87 | 11.94 | 12.53 |
| Resonance Frequency | Mode 1 [kHz] | 20.42 | 21.35 | 14.98 | 25.79 | 16.18 | 23.84 | 18.41 | 19.87 |
| | Mode 2 [kHz] | 25.56 | 26.59 | 18.70 | 33.62 | 18.97 | 29.33 | 24.00 | 25.78 |
| | Mode 3 [kHz] | 45.27 | 46.38 | 42.56 | 52.74 | 34.15 | 45.70 | 48.27 | 49.52 |
| | Mode 4 [kHz] | 68.84 | 71.86 | 57.79 | 83.79 | 49.96 | 73.22 | 70.23 | 72.27 |
| | Mode 5 [kHz] | 70.69 | 73.33 | 59.08 | 87.70 | 57.68 | 76.92 | 73.43 | 75.42 |
| | Mode 6 [kHz] | 76.35 | 79.02 | 62.45 | 88.57 | 60.70 | 81.59 | 74.46 | 76.55 |

APPARATUS FOR MEASURING VIBRATION CHARACTERISTIC OF HEAD GIMBAL ASSEMBLY

BACKGROUND OF THE INVENTION

1. Field of the Invention

The present invention relates to an apparatus for measuring the vibration characteristic such as resonance characteristic of a head gimbal assembly, the head gimbal assembly being installed in a hard disk drive that is used with an information processor such as a computer.

2. Description of Related Art

A head gimbal assembly includes a head suspension and a slider attached to the head suspension and is driven by a voice coil motor, to move from track to track or follow a track on a hard disk. During the operation, the head gimbal assembly vibrates at high frequencies. It is important, therefore, to find the resonance characteristic of the head gimbal assembly and optimize the resonance characteristic.

There is a need of an apparatus capable of easily measuring the resonance characteristic of a head gimbal assembly.

An apparatus according to a related art for measuring the resonance characteristic of a head gimbal assembly employs a laser Doppler vibrometer to measure the vibration of a head of the head gimbal assembly. To vibrate the head gimbal assembly, the related art uses a shaker, and to measure the vibration of the shaker, the related art employs an accelerometer 103 shown in FIG. 14. The accelerometer 103 is attached to a fixture 101 that is fixed to the shaker. The accelerometer 103 in the fixture 101 limits the size, shape, and material of the fixture 101.

Head gimbal assemblies are being made smaller to reduce the sizes of devices in which the head gimbal assemblies are installed. Due to this, the resonance frequencies of head gimbal assemblies are increasing. In the related art of FIG. 14, the accelerometer 103 included in the fixture 101 limits the resonance frequency of a measuring apparatus employing the fixture 101. As a result, the related art raises a problem that the resonance frequency of a head gimbal assembly to be measured easily harmonizes with that of the measuring apparatus to make it impossible to measure the resonance frequency of the head gimbal assembly.

The above-mentioned related art is disclosed in Japanese Unexamined Patent Application Publication No. 2004-101186.

SUMMARY OF THE INVENTION

An object of the present invention is to provide an apparatus for measuring the vibration characteristic of a head gimbal assembly, having a wide range of resonance frequencies to be set.

In order to accomplish the object, an aspect of the present invention includes a shaker configured to shake the head gimbal assembly, a fixture configured to fix the head gimbal assembly to the shaker, a first laser Doppler vibrometer configured to detect a vibration velocity of the shaker, a second laser Doppler vibrometer configured to detect a vibration velocity of a head of the head gimbal assembly. According to the detected vibration velocities, the apparatus finds the vibration characteristic of the head gimbal assembly.

According to this aspect of the present invention, there is no need of arranging an accelerometer on the fixture to detect the vibration of the shaker. Accordingly, this aspect of the present invention can expand the degree of freedom in the size, shape, material, and the like of the measuring apparatus, to avoid the resonance frequency of the measuring apparatus from harmonizing with that of the head gimbal assembly and surely detect the vibration characteristic of the head gimbal assembly.

BRIEF DESCRIPTION OF THE DRAWINGS

FIG. 2 is an exploded perspective view showing a fixture according to the first embodiment;

FIG. 3 is a perspective view showing a fastened state of the fixture of FIG. 2;

FIG. 4 is a table showing calculated resonance frequencies of fixtures according to various embodiments of the present invention;

FIG. 9A is a graph showing a frequency-gain curve measured from the fixture of FIG. 8;

FIG. 9B is a graph showing a frequency-phase curve measured from the fixture of FIG. 8;

FIG. 9C is a graph showing frequency-gain curves measured from a head gimbal assembly;

FIG. 9D is a graph showing frequency-phase curves measured from the head gimbal assembly;

FIG. 12 is a table showing materials usable for a fixture and masses of the materials according to a fifth embodiment of the present invention;

FIG. 13 is a table showing materials usable for a fixture and the masses and resonance frequencies of the materials in various modes according to the fifth embodiment.

DETAILED DESCRIPTION OF EMBODIMENTS

An apparatus for measuring the vibration characteristic of a head gimbal assembly according to the present invention employs a pair of laser Doppler vibrometers to expand a setting range of resonance frequencies of the apparatus and correctly measure the vibration characteristic of the head gimbal assembly.

Figure 1:
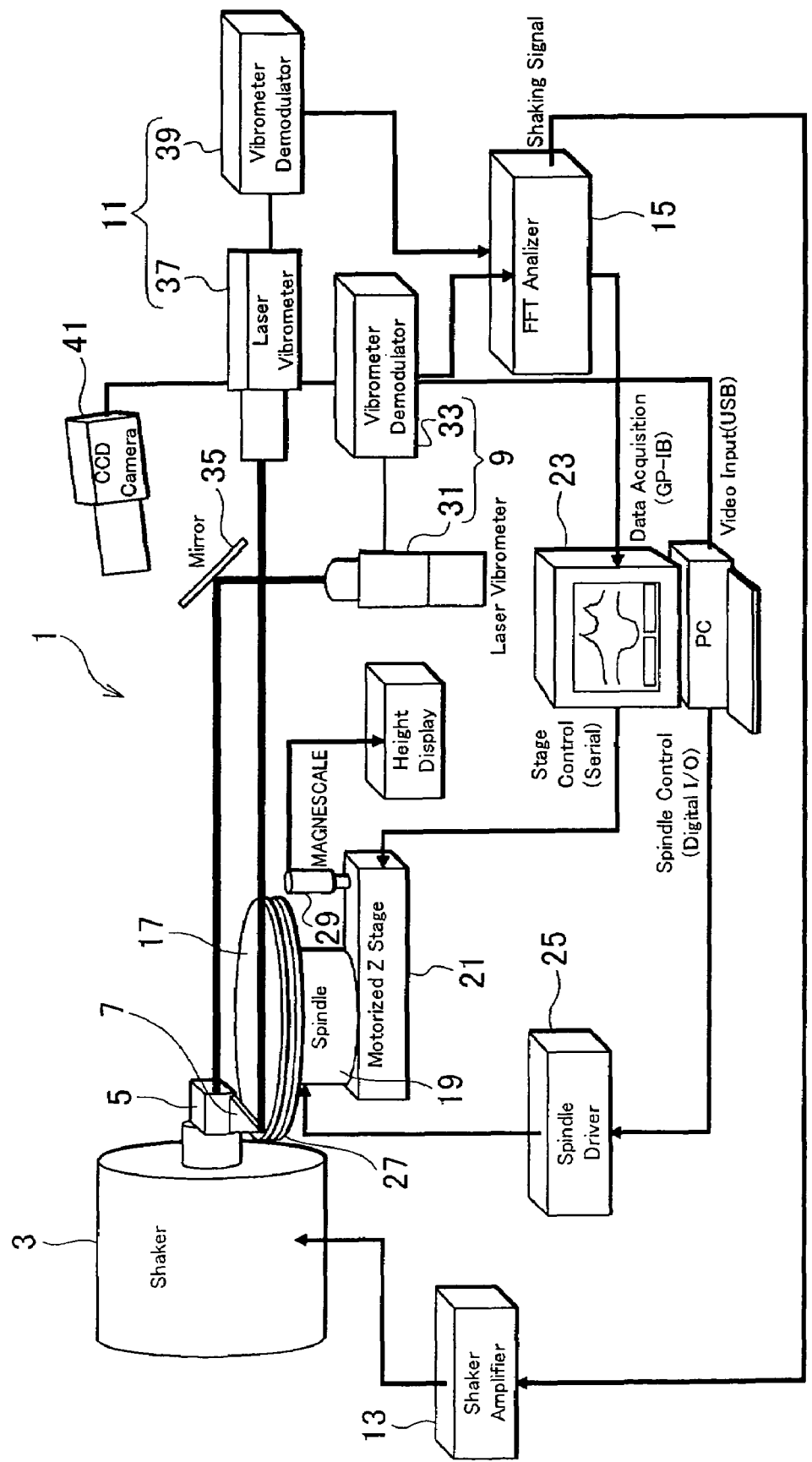
FIG. 1 is a block diagram showing an apparatus for measuring the vibration characteristic of a head gimbal assembly according to a first embodiment of the present invention.

FIG. 1 is a block diagram showing an apparatus 1 for measuring the vibration characteristic of a head gimbal assembly according to the first embodiment of the present invention.

In FIG. 1, the apparatus 1 has a shaker 3 to vibrate an object to be measured. To the shaker 3, a fixture 5 is attached, and to the fixture 5, a head gimbal assembly 7 to be measured is attached. The apparatus 1 includes first and second laser Doppler vibrometers 9 and 11 to measure the vibration characteristics of the shaker 3 and head gimbal assembly 7.

The shaker 3 is connected to a shaker amplifier 13 that receives a shaking signal from an FFT (Fast Fourier Transform) analyzer 15, to shake the fixture 5 to which the head gimbal assembly 7 is attached. The details of the fixture 5 will be explained later.

The head gimbal assembly 7 is arranged above a disk 17 that is turned by a motor 19. The motor 19 is arranged on a stage 21 and is driven from a personal computer 23 through a driver 25.

The stage 21 is vertically adjustable under the control of the personal computer 23, to adjust a Z-height of a head 27 of the head gimbal assembly 7 relative to the disk 17. The stage 21 has a scale 29 to directly measure the Z-height.

The first laser Doppler vibrometer 9 detects a vibration velocity of the fixture 5 of the shaker 3 and supplies a detected result to the FFT analyzer 15. The vibrometer 9 includes a probe 31 and a Doppler vibrometer 33. The probe 31 emits a laser beam that advances orthogonally to the fixture 5. A reflection mirror 35 is arranged between the probe 31 and the fixture 5, to orthogonally reflect the laser beam from the probe 31 toward the fixture 5. The probe 31 receives the reflected light of the laser beam reflected by the fixture 5.

The second laser Doppler vibrometer 11 detects a vibration velocity of a slider attached to the head 27 of the head gimbal assembly 7 and supplies a detected result to the FFT analyzer 15. The vibrometer 11 includes a probe 37 and a Doppler vibrometer 39. The probe 37 emits a laser beam to a side face of the slider. The probe 37 receives the reflected light of the laser beam reflected by the slider. The position of a spot of the laser beam on the slider is photographed with a CCD camera 41 controlled by the personal computer 23. The photographed image from the CCD camera 41 is transferred to the personal computer 23.

Instead of the first laser Doppler vibrometer 9, the second laser Doppler vibrometer 11 may orthogonally be arranged with respect to the slider, so that a laser beam from the vibrometer 11 is reflected by a mirror toward the slider. Alternatively, both the first and second laser Doppler vibrometers 9 and 11 may orthogonally be arranged with respect to the irradiation objects, so that laser beams from the vibrometers 9 and 11 are reflected by mirrors toward the objects.

The FFT analyzer 15 is controlled by the personal computer 23, receives measured values from the Doppler vibrometers 33 and 39, converts analog data in a time domain into digital data in a frequency domain, and calculates transfer functions. The calculated transfer functions are stored in the personal computer 23. Also, the FFT analyzer 15 provides the shaker 3 with a shaking signal.

The first and second laser Doppler vibrometers 9 and 11 measure vibrations, and the FFT analyzer 15 numerically calculates the gain and phase difference of the slider of the head 27 with respect to the shaker 3, to obtain the resonance characteristic of the head gimbal assembly 7.

The fixture 5 will be explained. FIG. 2 is an exploded perspective view showing the fixture 5 and FIG. 3 is a perspective view showing a fastened state of the fixture 5.

In FIGS. 2 and 3, the fixture 5 has a base block 43 and a mount block 45.

The base block 43 has a body 44 made of, for example, stainless steel (SUS) and having a rectangular parallelepiped shape. A side face of the body 44 is provided with a first external thread 47. The first external thread 47 protrudes from the side face of the body 44 and has a base 49 that is a shaft without a thread. The body 44 also has positioning pins 51 protruding from the side face of the body 44 on each side of the first external thread 47. An opposite side face of the body 44 opposite to the side face having the first external thread 47 is provided with a second external thread 53 to be fastened to the shaker 3.

The mount block 45 is made of, for example, stainless steel (SUS) and has a rectangular parallelepiped shape. The mount block 45 is configured to support the head gimbal assembly 7. The mount block 45 has first and second through holes 55 and 57. The first through hole 55 passes the first external thread 47. The second through holes 57 are positioning holes to receive the positioning pins 51 so that the base block 43 and mount block 45 are aligned relative to each other.

The second external thread 53 is fastened to an internal thread of the shaker 3, to fix the base block 43 to the shaker 3. Thereafter, the mount block 45 supporting the head gimbal assembly 7 is fixed to the base block 43.

To fix the mount block 45 to the base block 43, the first external thread 47 passes through the first through hole 55 to join the mount block 45 to the base block 43. In the joined state, a tip end of the first external thread 47 protrudes from the mount block 45. To the protruding tip end of the external thread 47, a nut 59 is fastened to fix the base block 43 and mount block 45 together.

In the fixed state, the positioning pins 51 are received in the second through holes 57, to correctly position the base block 43 and mount block 45 relative to each other.

Figure 5A:
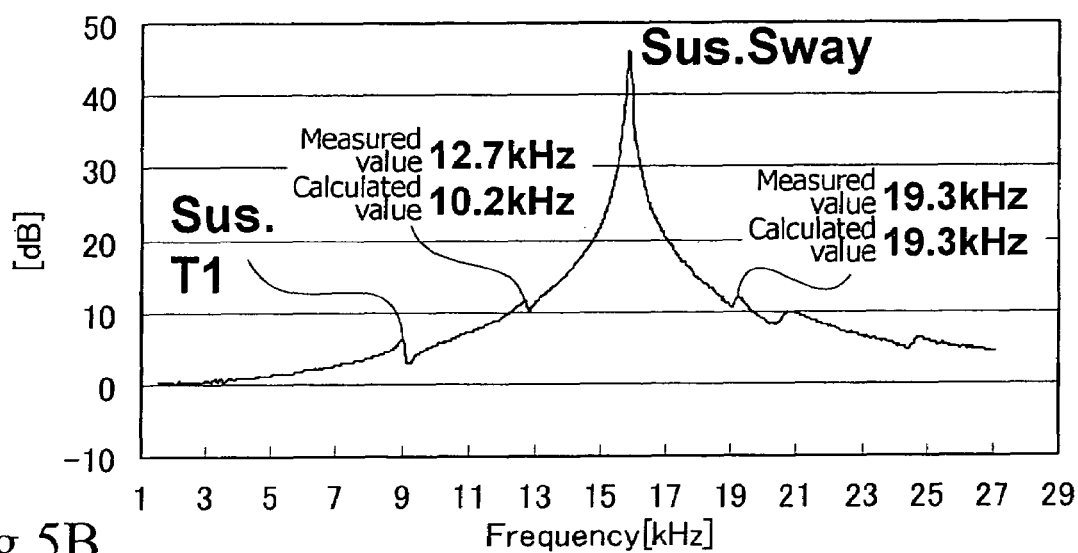
FIG. 5A is a graph showing a frequency-gain curve measured from the fixture of FIG. 3.
Figure 5B:
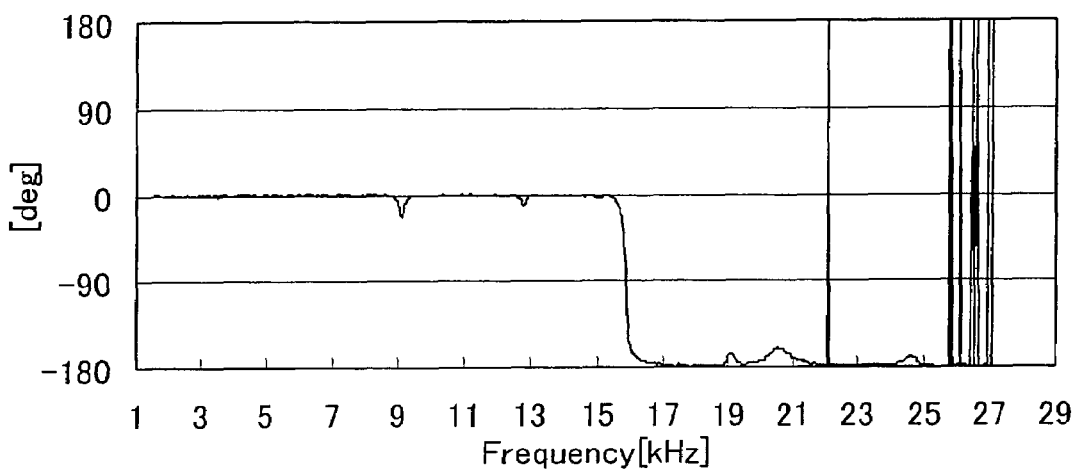
FIG. 5B is a graph showing a frequency-phase curve measured from the fixture of FIG. 3.

Resonance frequencies of the fixture 5 will be explained. FIG. 4 is a table showing calculated resonance frequencies of the fixture, FIG. 5A is a graph showing a frequency-gain curve measured from the fixture 5, and FIG. 5B is a graph showing a frequency-phase curve measured from the fixture 5. In FIG. 5A, an abscissa indicates frequency and an ordinate indicates gain. In FIG. 5B, an abscissa indicates frequency and an ordinate indicates phase. The head gimbal assembly 7 has a total length of 11 mm and a Z-height (ZH) of 0.711 mm. FIG. 5A also shows the calculated resonance frequencies for comparison.

In FIG. 4, the fixture 5 according to the first embodiment corresponds to "New Fixture." The fixture 5 has a calculated mass of 14.26 g. The resonance frequencies of the fixture 5 are calculated for first-order mode (mode 1) to fourth-order mode (mode 4) according to a finite element method. The calculated resonance frequencies of the modes 1, 2, 3, and 4 are 10.17 kHz, 19.33 kHz, 34.34 kHz, and 51.44 kHz, respectively.

In FIG. 5, measured resonance frequencies at resonance points where a phase inverts are 12.7 kHz and 19.3 kHz with respect to the calculated resonance frequencies of about 10.2 kHz and 19.3 kHz.

These resonance frequencies of the fixture 5 are higher than a first-order bending mode resonance frequency (Sus. T1) of 9 kHz of the head gimbal assembly 7 and are out of a sway mode resonance frequency (Sus. Sway) of the head gimbal assembly 7. The shaker 3 has resonance frequencies of 32 to 33 kHz.

It is understood that the fixture 5 according to the first embodiment can sufficiently achieve vibration characteristic measurement up to a resonance frequency of about 10.2 kHz in the first-order mode.

According to the first embodiment of the present invention, the apparatus 1 for measuring the vibration characteristic of a head gimbal assembly 7 includes the first laser Doppler vibrometer 9 to detect a vibration velocity of the shaker 3, the second laser Doppler vibrometer 11 to detect a vibration velocity of a head 27 of the head gimbal assembly 7, and the reflection mirror 35 to orthogonally reflect a laser beam emitted from at least one of the first and second laser Doppler vibrometers 9 and 11 toward the detection object. According to the detected vibration velocities, the apparatus 1 finds the vibration characteristic of the head gimbal assembly 7. There is no need for the apparatus 1 to have an accelerometer on the fixture, to detect the vibration of the shaker 3. As a result, the first embodiment can expand the degree of freedom in the size, shape, material, and the like of the apparatus 1, avoid the resonance frequency of the apparatus 1 from harmonizing with that of the head gimbal assembly 7 even if the resonance frequency of the head gimbal assembly 7 is high, and surely detect the vibration characteristic of the head gimbal assembly 7.

According to the first embodiment, the fixture 5 includes the base block 43 and mount block 45. The base block 43 has a rectangular parallelepiped shape, is fixed to the shaker 3, and has the first external thread 47. The mount block 45 is joined to the base block 43 with the first external thread 47 passed through the mount block 45. The nut 59 is fastened to the passed-through first external thread 47, to fix the base block 43 and mount block 45 together. The mount block 45 supports the head gimbal assembly 7. This configuration can surely increase resonance frequencies of the fixture 5.

The base block 43 having a rectangular parallelepiped shape is easy to manufacture and handle.

Figure 6:
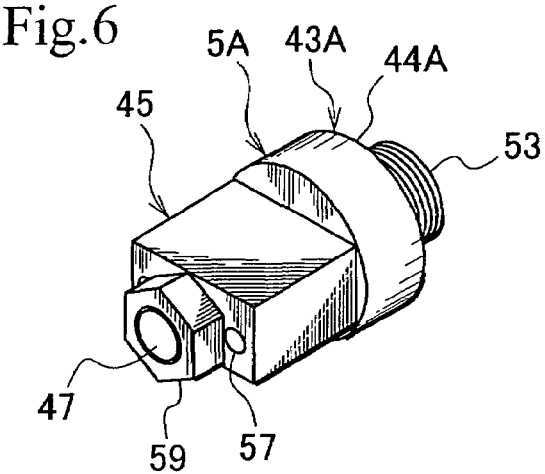
FIG. 6 is a perspective view showing a fixture according to a second embodiment of the present invention.

FIG. 6 is a perspective view showing a fastened state of a fixture according to the second embodiment of the present invention. The fixture according to the second embodiment is basically the same as that of the first embodiment, and therefore, like parts are represented with like reference numerals or like reference numerals plus "A."

In FIG. 6, the fixture 5A according to the second embodiment has a base block 43A. A body 44A of the base block 43A has a cylindrical shape with a circular section.

The fixture 5A corresponds to "High Mode-1" in the table of FIG. 4 and has resonance frequencies in the modes 1 to 4 as shown in "High Mode-1."

In FIG. 4, a calculated mass of the fixture 5A is 15.69 g that is slightly heavier than the fixture 5 of the first embodiment. The resonance frequencies of the fixture 5A are 11.12 kHz, 19.67 kHz, 37.66 kHz, and 53.96 kHz under the modes 1 to 4, respectively.

It is understood that the body 44A of circular section of the fixture 5A is effective to increase resonance frequencies.

The fixture 5A can sufficiently achieve vibration characteristic measurement up to a resonance frequency of about 11.1 kHz in the first-order mode.

Figure 7:
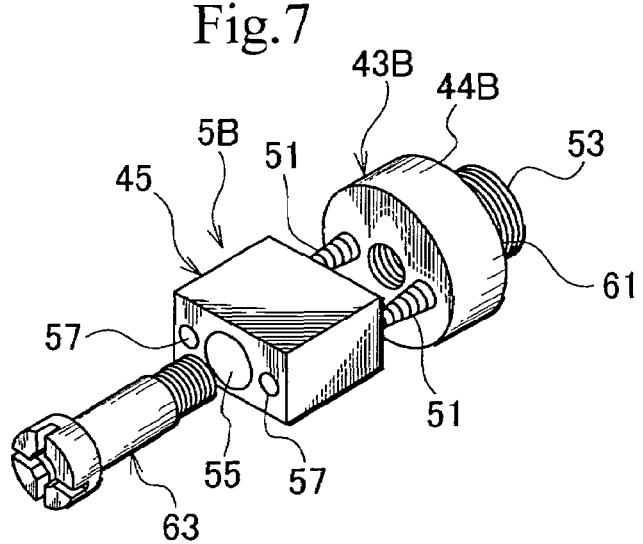
FIG. 7 is an exploded perspective view showing a fixture according to a third embodiment of the present invention.
Figure 8:
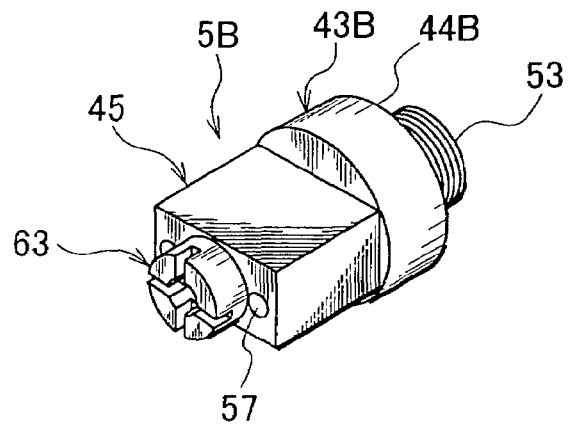
FIG. 8 is a perspective view showing a fastened state of the fixture of FIG. 7.

FIGS. 7 and 8 are views showing a fixture according to the third embodiment of the present invention, in which FIG. 7 is an exploded perspective view showing the fixture and FIG. 8 is a perspective view showing a fastened state of the fixture. The fixture according to the third embodiment is basically the same as that of the first embodiment, and therefore, like parts are represented with like reference numerals or like reference numerals plus "B."

In FIGS. 7 and 8, the fixture 5B according to the third embodiment has a base block 43B. A body 44B of the base block 43B has an internal thread 61 into which a external thread of a bolt 63 serving as a fixing part and made of, for example, stainless steel (SUS) is fastened. A mount block 45 has a first through hole 55. The base block 43B and mount block 45 are attached to each other with the first through hole 55 aligned with the internal thread 61. Thereafter, the external thread of the bolt 63 is passed through the first through hole 55 and is fastened to the internal thread 61, so that the base block 43B is held between a head of the bold 63 and the base block 43B to fix the base block 43B and mount block 45 together as shown in FIG. 8.

The fixture 5B according to the third embodiment corresponds to "High Mode-2" in the table of FIG. 4 and has resonance frequencies in the modes 1 to 4 as shown in "High Mode-2."

In FIG. 4, a calculated mass of the fixture 5B is 15.59 g that is slightly heavier than the fixture 5 of the first embodiment. The resonance frequencies of the fixture 5B are 20.42 kHz, 25.56 kHz, 45.27 kHz, and 68.84 kHz under the modes 1 to 4, respectively.

FIG. 9A is a graph showing a frequency-gain curve measured from the fixture 5B, FIG. 9B is a graph showing a frequency-phase curve measured from the fixture 5B, FIG. 9C is a graph showing frequency-gain curves measured from a head gimbal assembly, and FIG. 9D is a graph showing frequency-phase curves measured from the head gimbal assembly. In FIGS. 9A and 9C, an abscissa indicates frequency and an ordinate indicates gain. In FIGS. 9B and 9D, an abscissa indicates frequency and an ordinate indicates phase. The head gimbal assembly 7 has a total length of 11 mm and Z-heights (ZH) of 0.406 mm, 0.559 mm, and 0.711 mm.

In FIGS. 9A to 9D, a measured resonance frequency of the fixture 5B in the first-order mode is 18.6 kHz that is higher than a resonance frequency of the head gimbal assembly 7 in a sway mode (Sus. Sway).

It is understood from the measurement results that the fixture 5B employing the bolt 63 can further increase resonance frequencies.

The fixture 5B according to the third embodiment can sufficiently achieve vibration characteristic measurement up to a resonance frequency of about 20.4 kHz (actual measurement of 18.6 kHz) in the first-order mode.

Figure 10:
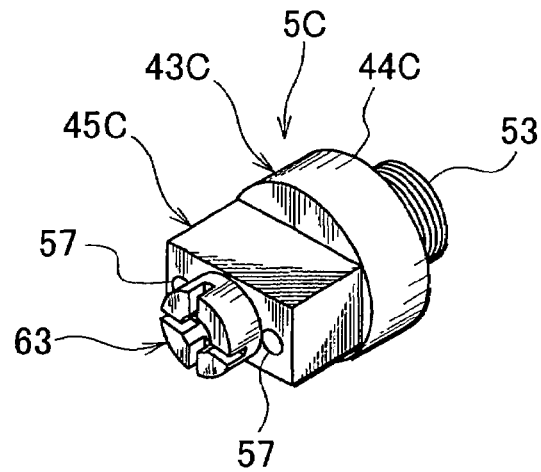
FIG. 10 is a perspective view showing a fixture according to a fourth embodiment of the present invention.

FIG. 10 is a perspective view showing a fastened state of a fixture according to the fourth embodiment of the present invention. The fixture according to the fourth embodiment is basically the same as that of the third embodiment, and therefore, like parts are represented with like reference numerals or like reference numerals plus "C" instead of "B."

In FIG. 10, the fixture 5C of the fourth embodiment has a mount block 45C having a square parallelepiped shape. With the square section, the fixture 5C is shorter than the fixture 5B of the third embodiment having a rectangular section.

Compared with the fixture 5B of the third embodiment, the fixture 5C of the fourth embodiment is lighter and can secure rigidity.

Figure 11A:
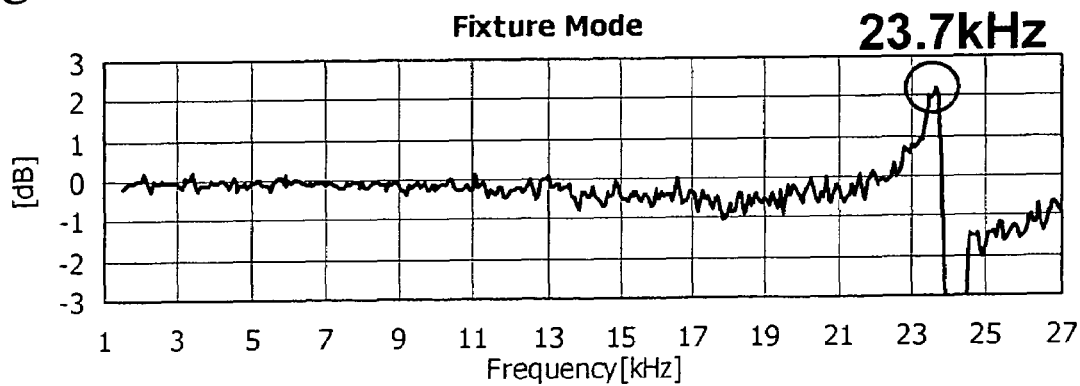
FIG. 11A is a graph showing a frequency-gain curve measured from the fixture of FIG. 10.
Figure 11B:
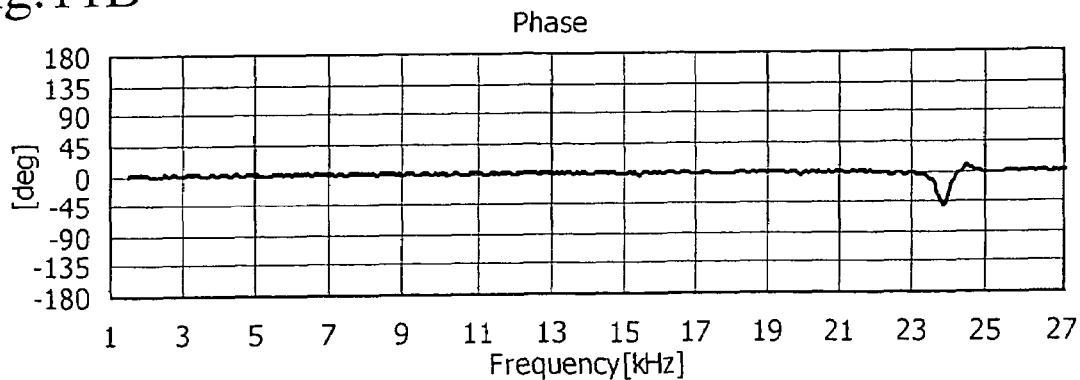
FIG. 11B is a graph showing a frequency-phase curve measured from the fixture of FIG. 10.
Figure 14:
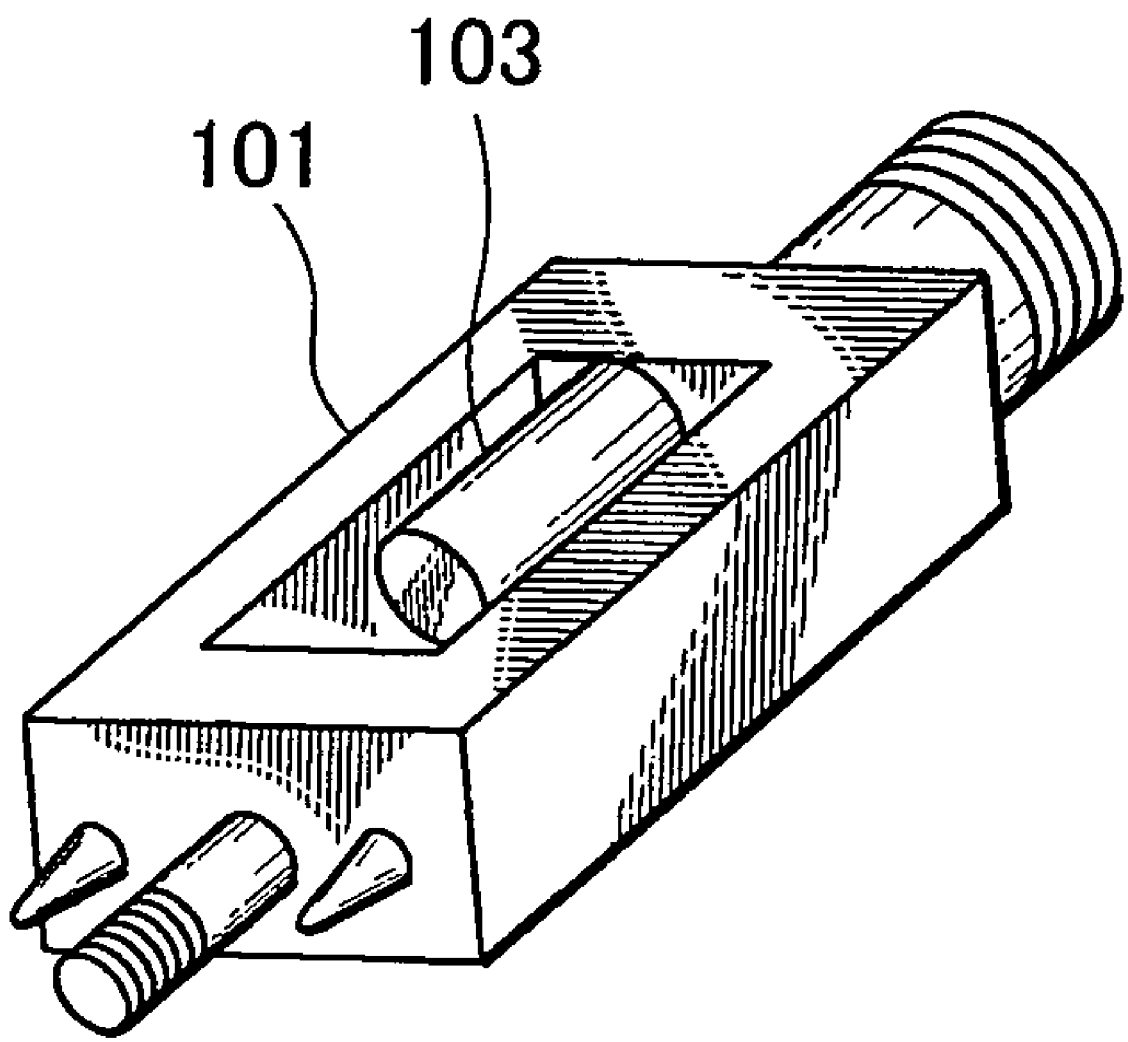
FIG. 14 is a perspective view showing a fixture according to a related art.

FIG. 11A is a graph showing a frequency-gain curve measured from the fixture 5C and FIG. 11B is a graph showing a frequency-phase curve measured from the same. In FIG. 11A, an abscissa indicates frequency and an ordinate indicates gain. In FIG. 11B, an abscissa indicates frequency and an ordinate indicates phase. The head gimbal assembly 7 of the first embodiment is used in the fourth embodiment with a Z-height (ZH) of 0.711 mm.

In FIGS. 11A and 11B, a measured resonance frequency in the first-order mode at a resonance point where a phase inverts is 23.7 kHz.

The fixture 5C according to the fourth embodiment can sufficiently achieve vibration characteristic measurement up to a resonance frequency of about 23.7 kHz in the first-order mode.

FIG. 12 is a table showing materials usable for a fixture according to the fifth embodiment and masses of the materials and FIG. 13 is a table showing materials usable for a fixture and the masses and resonance frequencies of the materials, according to the fifth embodiment.

The fifth embodiment selects materials for a fixture, for example, the fixture 5B of the third embodiment, to reduce the weight of the fixture and increase the resonance frequencies of the fixture.

In the table of FIG. 12, "Fixture" represents the base block 43B of the fixture 5B, "Mount Block" the mount block 45, and "Bolt" the bolt 63 shown in FIGS. 7 and 8. Values in cells of the table of FIG. 12 show masses when these parts 43B, 45, and 63 are made of stainless steel (SUS), light alloy, e.g., magnesium alloy (Mg alloy), and light metal, e.g., duralumin.

A model M03 in the table of FIG. 13 represents the fixture 5B having the base block 43B ("Fixture") made of SUS, mount block 45 ("Mount Block") made of Mg alloy, and bolt 63 ("Bolt") made of Mg alloy. According to the model M03, the fixture 5B has a calculated mass of 10.20 g and a first-order-mode resonance frequency of 25.79 kHz that is satisfactorily high.

A model M05 is the fixture 5B having the base block 43B made of SUS, mount block 45 made of SUS, and bolt 63 made of Mg alloy. According to the model MOS, the fixture 5B has a calculated mass of 13.87 g and a firs-order-mode resonance frequency of 23.84 kHz that is satisfactorily high.

By making at least the bolt 63 from light metal or light alloy, the fixture 5B can provide satisfactorily high resonance frequencies to sufficiently measure the vibration characteristic of a head gimbal assembly up to high frequencies.

In this way, one of the base block 45, mount block 43B, and bolt 63 is made of one of light metal and light alloy, thereby sufficiently measuring the vibration characteristic of a head gimbal assembly up to high frequencies.

The other models M01, M02, M04, M06, and A04 shown in FIG. 13 with selected materials also realize high resonance frequencies exceeding 14.98 kHz, to sufficiently measure the vibration characteristic of a head gimbal assembly up to high frequencies.

The first, second, and fourth embodiment can also employ materials selected for respective parts, to reduce the weight of each fixture and increase the resonance frequencies of the fixture.

What is claimed is:

1. An apparatus for measuring a vibration characteristic of a head gimbal assembly, comprising:
    a shaker configured to shake the head gimbal assembly;
    a fixture configured to fix the head gimbal assembly to the shaker;
    a first laser Doppler vibrometer configured to detect a first vibration velocity of the shaker;
    a second laser Doppler vibrometer configured to detect a second vibration velocity of a head of the head gimbal assembly;
    the apparatus being configured to find the vibration characteristic of the head gimbal assembly according to the detected first and second vibration velocities;
    wherein the fixture comprises:
        a base block fixed to the shaker and having an external thread;
        a mount block having a through hole and joined to the base block with the external thread of the base block being passed through the through hole, the mount block supporting the head gimbal assembly; and
        a nut fastened to the external thread tat protrudes from the mount block, to fix the mount block and the base block together.

2. The apparatus of claim 1, wherein the base block has one of a rectangular parallelepiped shape and a cylindrical shape.

3. The apparatus of claim 1, wherein the mount block has a rectangular sectional shape to reduce the total length of the fixture.

4. The apparatus of claim 1, wherein at least one of the base block and mount block is made of one of light metal and light alloy.

5. An apparatus for measuring a vibration characteristic of a head gimbal assembly, comprising:
    a shaker configured to shake the head gimbal assembly;
    a fixture configured to fix the head gimbal assembly to the shaker;
    a first laser Doppler vibrometer configured to detect a first vibration velocity of the shaker;
    a second laser Doppler vibrometer configured to detect a second vibration velocity of a head of the head gimbal assembly;
    the apparatus being configured to find the vibration characteristic of the head gimbal assembly according to the detected first and second vibration velocities;
    wherein the fixture comprises:
        a base block fixed to the shaker and having an internal thread;
        a mount block having a through hole and joined to the base block so that the through hole agrees with the internal thread, the mount block supporting the head gimbal assembly; and
        a bolt passed through the through hole of the mount block and fastened to the internal thread of the base block, to fix the mount block and the base block together.

6. The apparatus of claim 5, wherein the base block has one of a rectangular parallelepiped shape and a cylindrical shape.

7. The apparatus of claim 5, wherein the mount block has a rectangular sectional shape to reduce the total length of the fixture.

8. The apparatus of claim 5, wherein one of the base block, the mount block, or the bolt is made of one of light metal or light alloy.

* * * * *